United States Patent [19]

Straub et al.

[11] Patent Number: 4,595,737
[45] Date of Patent: Jun. 17, 1986

[54] WATER-SOLUBLE TERPOLYMERS AND THEIR PREPARATION

[75] Inventors: Ferdinand Straub, Hockenheim; Oral Aydin, Mannheim; Wolfgang Linke, Ludwigshafen; Gerd Schroeder, Limburgerhof; Peter Fickeisen, Dirmstein, all of Fed. Rep. of Germany

[73] Assignee: BASF Aktiengesellschaft, Ludwigshafen, Fed. Rep. of Germany

[21] Appl. No.: 748,986

[22] Filed: Jun. 26, 1985

[30] Foreign Application Priority Data

Jun. 26, 1984 [DE] Fed. Rep. of Germany ....... 3423446

[51] Int. Cl.$^4$ .............................................. C08F 26/08
[52] U.S. Cl. .................................. 526/264; 526/307.1
[58] Field of Search ................... 526/264, 307.1, 307.5, 526/307.6

[56] References Cited

U.S. PATENT DOCUMENTS

| | | |
|---|---|---|
| 3,345,320 | 10/1967 | Uffner et al. . |
| 3,458,487 | 7/1969 | Mortimer ........................... 526/307.5 |
| 3,696,085 | 10/1972 | Lederer ................................. 526/264 |
| 4,277,592 | 7/1981 | Eichhorn .......................... 526/307.1 |
| 4,462,838 | 7/1984 | Andres et al. . |
| 4,464,202 | 8/1984 | Andres et al. . |
| 4,510,302 | 4/1985 | Kolb ..................................... 526/264 |

FOREIGN PATENT DOCUMENTS 2073209A 4/1980 United Kingdom .

Primary Examiner—Paul R. Michl
Attorney, Agent, or Firm—Oblon, Fisher, Spivak, McClelland & Maier

[57] ABSTRACT

Water-soluble terpolymers which contain, as copolymerized units,
(a) from 10 to 35% by weight of an N-vinyllactam or an N-vinyl acid amide,
(b) from 5 to 20% by weight of acrylic acid or of a salt of acrylic acid and
(c) from 80 to 50% by weight of a $C_1$–$C_4$-alkyl vinyl ether, and have a glass transition temperature $T_g$ below 60° C. can be prepared by polymerizing the monomer mixture in an inert organic solvent in the presence of a polymerization initiator and can, where appropriate, be partially or completely neutralized with a base, so as to form a salt. The products may be used as raw materials for adhesives or, in the form of an aqueous solution, as the adhesive itself.

11 Claims, No Drawings

WATER-SOLUBLE TERPOLYMERS AND THEIR PREPARATION

Most of the synthetic water-soluble polymers, such as polyvinylpyrrolidone, polyacrcylamide, polyvinyl alcohol, polyacrylic acid and polymethacrylic acid are very brittle because they have very high glass transition temperatures. Accordingly, for use as, for example, adhesives, they have to be combined with natural substances such as starch and dextrin (U.S. Pat. Nos. 4,462,838 and 4,464,202) or be tackified with plasticizers (U.S. Pat. No. 3,345,320). In the water-moistenable adhesives, the water serves as plasticizer, but the great disadvantage of these products is that upon drying the adhesion diminishes, through embrittlement of the polymer, and the glued materials separate. On the other hand, there is a need for water-moistenable or water-dissolved adhesives, because, firstly, they contain no organic solvents and hence help to protect the environment and, secondly, the adhesive bond can, if desired, be broken again by using a large amount of water (as in labels or postage stamps). The polymers hitherto employed either had to be expensively compounded with other adhesives or plasticizers or, when only water was used as the plasticizer, no longer acted adhesively after they had dried.

In the mixtures with polyacrylates disclosed in British Pat. No. 2,073,209, the adhesives obtained are not water-soluble but water-resistant. Polyacrylates furthermore have the disadvantage that on being kept in aqueous solution they partially hydrolyze, as a result of which the product properties change. U.S. Pat. No. 3,345,320 discloses water-moistenable hot-melt adhesives which consist of a mixture of a copolymer of N-vinyllactams and a vinyl ester or vinyl ether, together with a plasticizer, for example a polyol. Even if only small amounts of vinyl ethers or vinyl esters are present as copolymerized units in the N-vinyllactam copolymers, the latter become water-insoluble. There is no noticeable improvement in adhesion compared to N-vinyllactam homopolymers.

It is the object of the invention to provide a copolymer based on N-vinyllactams or N-vinylcarboxylic acid amides which, without addition of other products, can be applied from aqueous solution to substrates which are to be glued, and which acts adhesively even in the dried state.

We have found that this object is achieved, according to the invention, with water-soluble terpolymers which contain, as copolymerized units, (a) from 10 to 35% by weight of an N-vinyllactam or an N-vinyl acid amide,
(b) from 5 to 20% by weight of acrylic acid or of a salt of acrylic acid and
(c) from 80 to 50% by weight of a $C_1$–$C_4$-alkyl vinyl ether, and which have a glass transition temperature $T_g$ below 6° C. These water-soluble terpolymers can be prepared by polymerizing a monomer mixture of (a) from 10 to 35% by weight of an N-vinyllactam or an N-vinyl acid amide,
(b) from 5 to 20% by weight of acrylic acid
(c) from 80 to 50% by weight of a $C_1$–$C_4$-alkyl vinyl ether, in an inert organic solvent in the presence of a polymerization initiator and, where appropriate, partially or completely neutralizing the product with a base, so as to form a salt.

It was not foreseeable that acrylic acid was copolymerizable with vinyllactams and vinyl ethers since it is known that the vinyllactams, such as vinylpyrrolidone, and vinyl ethers decompose in aqueous solution under the influence of weak acids, cf. J. Ferguson, V. S. Rajan, European Polymer Journal, 15 (1979), 627; Kühn and Biret, Merkblätter Gefährliche Arbeitsstoffe V 10, V 12).

Suitable components (a) for the preparation of the terpolymers are N-vinyllactams and/or N-vinyl acid amides. The preferred N-vinyllactams are N-vinylpyrrolidone and N-vinylcaprolactam. Suitable N-vinyl acid amides are derived from the acid amides of saturated carboxylic acids of 1 to 4 carbon atoms. These compounds have the general formula

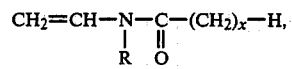

where R is H or $C_1$–$C_4$-alkyl and X is from 0 to 3. Examples of compounds of this type are N-vinylformamide, N-vinyl-N-methylformamide and N-vinylacetamide.

Acrylic acid is employed as component (b) of the monomer mixture. The amount of acrylic acid in the mixture is from 5 to 20, preferably from 10 to 15, % by weight.

Component (c) of the monomer mixture is a $C_1$–$C_4$-alkyl vinyl ether. Of course, a mixture of a plurality of the said alkyl vinyl ethers may also be employed. The alkyl vinyl ethers concerned are vinyl methyl ether, vinyl ethyl ether, vinyl n-propyl ether, vinyl isopropyl ether and vinyl butyl ethers, the isomers, namely vinyl n-, iso- or tert.-butyl ether, being employable in the last-mentioned case. The monomer mixture contains from 80 to 50% by weight of vinyl alkyl ethers. The watersoluble terpolymers are prepared by polymerizing the monomer mixture of (a), (b) and (c) in an inert organic solvent in the presence of a polymerization initiator. The polymerization can for example be carried out as a solution polymerization in a monohydric saturated $C_1$–$C_4$-alcohol or a cyclic ether, such as tetrahydrofuran or dioxane, or in a solvent mixture. The polymer solids concentration can vary within a wide range; for example, from 1% to 60% strength by weight solutions of the terpolymer in the said solvents can be prepared.

However, the polymerization of the monomers can also be carried out in the manner of a precipitation polymerization. As solvents for the monomers there are used, for example, esters of saturated $C_1$–$C_4$-carboxylic acids and monohydric, saturated $C_1$–$C_8$-alcohols, ethers, ketones or chlorohydrocarbons. In cases where the polymerization rate is greater than the rate of decomposition of the N-vinyllactam, the water content of the solvents can be up to 15% by weight. However, in general it is advantageous if the water content of the solvent used for the monomers is less than 1% by weight. Preferably, the polymerization is carried out in an anhydrous, inert organic solvent and terpolymers of N-vinylpyrrolidone, acrylic acid and a $C_1$–$C_4$-alkyl vinyl ether are prepared by solution polymerization in a monohydric saturated alcohol (i.e. an alkanol), dioxane or tetrahydrofuran. The K value of the polymers is mostly from 10 to 100. The terpolymers have a glass transition temperature $T_g$ which is below 60° C. This glass transition temperature is determined by differential thermoanalysis (DTA), cf. B. Vollmert, Grundriss der Makromolekularen Chemie, E. Vollmert-Verlag, Karlsruhe 1979, volume 4, page 150.

The polymerization is carried out in the presence of the conventional initiators, for example azo initiators, e.g. azo-bis-isobutyronitrile, diacyl peroxides, per-esters and dialkyl peroxides. The conventionally used redox catalysts may also be employed. The polymerization can, where appropriate, be carried out in the presence of polymerization regulators. In most cases, the polymerization is carried out at from 20° to 150° C., preferably under atmospheric pressure, but it can also be performed under reduced pressure or superatmospheric pressure.

Following the polymerization, the terpolymers are neutralized where appropriate. For example, neutralization can be carried out simultaneously with distilling off the solvent, a base being added. Preferably, steam distillation is used to distill off the solvent. Suitable bases are ammonia, alkali metal hydroxides, alkaline earth metal hydroxides, alkali metal carbonates and bicarbonates as well as alkaline earth metal carbonates and oxides. Preferably, ammonia, sodium hydroxide solution or potassium hydroxide solution is used for neutralizing.

Amines may also be used to neutralize the terpolymers, for example methylamine, ethylamine, trimethylamine, butylamine, ethanolamine and polyethyleneimine. The terpolymers are mostly neutralized to the extent of not less than 10%, and up to 100%. Clear to transparent aqueous solutions are obtained, depending on the degree of neutralization. The precipitation polymers can be converted to aqueous solutions by treatment with aqueous bases. One liter of water will dissolve not less than 50 g of the terpolymer. The terpolymer may be used either as a raw material for adhesives or, in the form of an aqueous solution, directly as an adhesive.

In the Examples, parts are by weight and percentages are based on the weight of the materials employed. The K values were determined by the method of H. Fikentscher, Cellulosechemie 13 (1932), 58–64 and 71–74, at 20° C., in fully demineralized water; $K = k \cdot 10^3$.

The glass transition temperatures were determined by differential thermoanalysis (DTA), cf. B. Vollmert, Grundriss der Makromolekularen Chemie, E. Vollmert-Verlag, Karlsruhe 1979, volume 4, page 150.

EXAMPLE 1

A terpolymer of N-vinylpyrrolidone, acrylic acid and vinyl isobutyl ether was prepared in a flask equipped with a stirrer, reflux condenser and three dropping funnels. The following were dripped continuously, over 5 hours, into the flask: from dropping funnel I, a mixture of 142 parts of N-vinylpyrrolidone, 48 parts of acrylic acid and 80 parts of tert.-butanol and from dropping funnel II a mixture of 285 parts of vinyl isobutyl ether and 80 parts of tert.-butanol. As from the start of the monomer addition, a total of 5 parts of tert.-butyl perpivalate in 100 parts of tert.-butanol were added, over 6 hours, from dropping funnel III. The tert.-butanol was anhydrous. The polymerization temperature was kept at 75° C. Further solvent can be added to lower the viscosity of the reaction product formed.

After completion of the initiator addition, the reaction mixture was kept for 60 minutes at 80° C. and then freed from solvent by introducing steam, a 10% strength aqueous sodium hydroxide solution being added from a dropping funnel simultaneously with the introduction of the steam. When all the solvent had been distilled off (it has passed over at 98° C.), the terpolymer was diluted with water and the aqueous solution was cooled. The terpolymer had a K value of 32 and a glass transition temperature $T_g$ of 30° C.

EXAMPLES 2 TO 8

Using the method described in Example 1, the monomers shown in the Table below were polymerized in the solvent shown in the table. The solvents used were anhydrous. The table also shows the K values and glass transition temperatures of the terpolymers.

| Example | Solvent | vinyl pyrrolidone | acrylic acid | vinyl methyl ether | vinyl ethyl ether | vinyl butyl ether | K value | $T_g$ (°C.) |
|---|---|---|---|---|---|---|---|---|
| 2 | isopropanol | 150 | 100 | — | — | 250 | 16 | 46 |
| 3 | ethanol | 100 | 100 | 300 | — | — | 28 | 37 |
| 4 | tert.-butanol | 100 | 50 | — | — | 350 | 46 | 7 |
| 5 | ethanol | 50 | 100 | — | 350 | — | 24 | 17 |
| 6 | tert.-butanol | 50 | 100 | 250 | 50 | — | 35 | 15 |
| 7 | tetrahydrofuran | 150 | 100 | — | — | 250 | 22 | 46 |
| 8 | dioxane | 100 | 50 | — | 350 | — | 29 | 23 |

The terpolymers shown in the table can be used as raw materials for the production of adhesives suitable for gluing paper.

We claim:

1. A water-soluble terpolymer which contains, as copolymerized units,
   (a) from 10 to 35% by weight of an N-vinyllactam or an N-vinyl acid amide,
   (b) from 5 to 20% by weight of acrylic acid or of a salt of acrylic acid and
   (c) from 80 to 50% by weight of a $C_1$–$C_4$-alkyl vinyl ether, and which has a glass transition temperature $T_g$ below 60° C.

2. The water-soluble terpolymer of claim 1, wherein said N-vinyllactam is N-vinylpyrrolidone or N-vinylcaprolactam.

3. The water soluble terpolymer of claim 1, wherein said N-vinylacidamide is a compound of the formula:

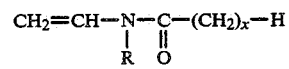

wherein R is hydrogen or $C_1$–$C_4$-alkyl and x is from 0 to 3.

4. The water-soluble terpolymer of claim 3, wherein said N-vinylacidamide is N-vinylformamide, N-vinyl-N-methylformamide or N-vinylacetamide.

5. The water-soluble terpolymer of claim 1, wherein said acrylic acid component is present in the terpolymer in an amount of 10–15% by weight.

6. The water-soluble terpolymer of claim 1, wherein said $C_1-C_4$ alkylvinyl ether is vinylmethyl ether, vinylethyl ether, vinyl-n-propyl ether, vinylisopropyl ether or vinylbutyl ether.

7. A process for the preparation of a watersoluble terpolymer, comprising:
copolymerizing (i) from 10 to 35% by weight of an N-vinyllactam or an N-vinyl acid amide, (ii) from 5 to 20% by weight of acrylic acid and (iii) from 80 to 50% by weight of a $C_1-C_4$-alkyl vinyl ether, in an inert organic solvent in the presence of a polymerization initiator.

8. The process of claim 7, which further comprises: partially or completely neutralizing the terpolymer product with a base in order to form a salt of said terpolymer.

9. The process of claim 7, wherein said solvent is a monohydric saturated $C_1-C_4$-alcohol, tetrahydrofuran, dioxane or mixture thereof.

10. The process of claim 7, which comprises:
polymerizing said monomers in a solution of an ester of a saturated $C_1-C_4$-carboxylic acid and a monohydric $C_1-C_8$-alcohol, an ether, ketone or a chlorohydrocarbon, with the result that the terpolymer product precipitates from solution as it forms.

11. The process of claim 7, wherein the water content of the solvent is less than 1% by weight.

* * * * *